United States Patent [19]

Elmi

[11] Patent Number: 5,362,407
[45] Date of Patent: Nov. 8, 1994

[54] CIRCULAR GRAVITY CLARIFIER AND METHOD

[75] Inventor: Hadi Elmi, The Woodlands, Tex.

[73] Assignee: Modern Welding Company, Inc., Houston, Tex.

[21] Appl. No.: 47,850

[22] Filed: Apr. 15, 1993

[51] Int. Cl.⁵ .............................................. B01D 21/02
[52] U.S. Cl. .................... 210/801; 210/803; 210/520; 210/525; 210/540
[58] Field of Search ............. 210/520, 521, 522, 525, 210/528, 540, 532.1, 534, 776, 801, 803

[56] References Cited

U.S. PATENT DOCUMENTS

| | | | |
|---|---|---|---|
| 1,337,094 | 4/1920 | Peck | 210/528 |
| 1,357,587 | 11/1920 | Peck | 210/528 |
| 2,681,151 | 6/1954 | Coulter | 210/528 |
| 2,876,863 | 3/1959 | Kivari | 210/529 |
| 3,951,816 | 4/1976 | Bascope et al. | 210/525 |
| 4,070,277 | 1/1978 | Uban et al. | 210/525 |
| 4,367,141 | 1/1983 | Dörömbözi et al. | 210/520 |

*Primary Examiner*—Christopher Upton
*Attorney, Agent, or Firm*—James F. Weiler

[57] ABSTRACT

Disclosed is a circular gravity clarifier for and method of clarifying liquids of entrained liquid droplets and solids. The clarifier has an upright cylindrical body, a cylindrical baffle extending substantially the depth of the body forming an annular flow path, a rotating stilling well in which the liquid to be clarified is introduced and flows downwardly in a generally cone shaped pattern, the liquid droplets rising to the surface where they are removed, and the clarified liquid flows upwardly in the annular flow path and is discharged. A number of features of the clarifier and the method is disclosed.

10 Claims, 2 Drawing Sheets

CIRCULAR GRAVITY CLARIFIER AND METHOD

FIELD OF THE INVENTION

This invention is in the field of gravity clarification of liquids from entrained liquid droplets and solids.

BACKGROUND OF THE INVENTION

Clarifiers can be used for separating a variety of liquids from liquids, such as removing suspended hydrocarbon or oils from water, such as from tank farms, petroleum marketing facilities, refineries, utilities, gasoline stations, vehicle repair and maintenance shops, petrochemical plants, truck stops, parking lots, steel mills, storm water run off, surface run off, street wash waters, and the like. Various state and fedral cts and regulations prohibit discharge of any pollutants to U.S. navigable waters, pollution from natural storm water run off as well as elicit disposal in the storm sewer. Under current storm water regulations, drainage systems must be capable of removing contaminants, such as the ptroleum hydrocarbons, from storm water run off at least down to 15 pacts per million concentrations, which include the removal of all petroleum droplets equal to or greater than 20 microns in size.

Conventional methods of separating liquid droplets entrained in liquids, such as oil in water, and separating solids in liquids, include gravity separation, filtration, absorption, cohesion dispersion, air flotation, microbiological, electrolytic, physical, chemical, and coalescing methods.

The circular clarifier of the present invention is particularly suitable for gravity separation of entrained liquid droplets and solids from liquids, such as oil from water, solids from water, and oil and solids from water. The clarifier can be utilized as an oil-water separator, a primary settling tank in industrial waste applications, a secondary settling tank for biological treatment processes in domestic and industrial waste applications, and for the applications set forth above.

The following patents are illustrative of the state of the art developed in a preliminary search.

U.S. Pat. No. 3,966,617 discloses a tank with central feed, a rotating skimmer, and a peripheral collector.

U.S. Pat. No. 4,376,045. discloses a liquid treatment apparatus with a center feed, internal baffles, and an overflow weir.

U.S. Pat. No. 3,353,676 discloses a tank having a cone bottom, center feed, and a weir.

U.S. Pat. No. 5,158,679 discloses an oil/water separator with an oil scraper.

U.S. Pat. No. 5,047,151 discloses a scum skimming system for circular sedimentation tanks having a central feed and weir, but it also has a bottom scraper.

U.S. Pat. No. 5,015,392 discloses a thickener gravity separator with a cone bottom.

U.S. Pat. No. 4,983,294 discloses a separator with a cone bottom that uses fluid velocity to scrape the bottom or the tank.

U.S. Pat. No. 4,915,823 discloses an oil/water separator having a central feed.

U.S. Pat. No. 4,137,173 discloses a tank with a trap for grease dissolved or entrained in a liquid.

U.S. Pat. No. 3,770,131 discloses a feedwell centered in a sedimentation pool.

U.S. Pat. No. 3,717,257 discloses a tank with a rotating skimmer and a peripheral weir.

German Patent No. 718 547 discloses a clarifier with a center feed, cone bottom, and internal baffles.

None of the foregoing patents or circular clarifiers available at present disclose the clarifier of the present invention, its mode of operation, or the methods of the present invention and their advantageous results.

SUMMARY OF THE INVENTION

The clarifier of the present invention comprises an enclosed upright cylindrical body, a cylindrical baffle disposed in and extending a substantial distance from adjacent the top to adjacent the bottom of the body thereby providing an annular flow path and includes a rotatable stilling well having either an upper or a closed top and an open bottom disposed at the upper end and centrally of the annular baffle, means for rotating the stilling well, inlet means having a discharge end in the stilling well introducing liquids to be clarified into the stilling well, and a continuous circular overflow weir disposed in the annular space adjacent the top of the baffle having an open top and a closed bottom, the weir being spaced from one of the baffle and the body thereby continuing the annular flow path to above the weir. First outlet means are connected to the bottom of the weir extending exteriorly of the body for discharge of clarified liquid from the overflow weir, a second outlet means having an outlet is disposed interiorly of and at the upper end of the annular baffle and has an outlet exteriorly of the body for discharge of gravity separated liquid droplets. The liquid to be clarified is introduced into the rotating stilling well and is distributed uniformly over the surface area of the baffle and flows downwardly in the interior of the baffle and then upwardly in the annular space into the weir and out the first outlet means, the lighter liquid droplets flowing upwardly within the cylindrical baffle and out the second outlet. The deep internal baffle provides a barrier and means for entrained liquid droplets to rise to the surface and also provides a barrier and means for sludge to settle in the bottom of the body which includes a sludge outlet, the deep internal baffle virtually eliminating the short circuit phenomena. The adjustable overflow weir ensures the levelness of the clarifier, and the water makes a complete flow loop pattern and exits the clarifier.

Preferably, the bottom is cone shaped which concentrates and reduces the volume of solids or sludge handling and eliminates the need for a conventional bottom scraper thereby reducing the disposal and handling costs and also reduces the size and cost of a skimmer assembly drive. The overflow weir is placed at the outer periphery of the body and thereby provides more net effective surface area than in conventional clarifiers. A skimmer is extended from the rotating stilling well adjacent the top of the cylindrical baffle which provides effective removal of entrained liquid droplets, such as oil, and floating material.

The method of the invention comprises flowing a liquid having entrained lighter droplets downwardly in a cone shaped pattern, the light droplets rising to the surface, and the clarified liquid flowing upwardly in a separate annular flow path around the downward flow path, removing the lighter droplets from the surface, and discharging the clarified liquid from the annular flow path.

Accordingly, it is an object of the present invention to provide a circular clarifier for and methods of gravity liquid/liquid/solid separation which can be utilized for waste applications such as oil/water separator, primary settling tank in industrial waste applications and secondary settling tank (clarifier) for biological treatment processes in domestic and industrial waste applications and one in which the fabrication costs are substantially reduced over conventional clarifiers.

A further object of the present invention is the provision of such a clarifier and method which eliminates the bypass problems of conventional clarifiers.

A further object of the present invention is the provision of such a clarifier in which the overflow weir is placed adjacent the outer perimeter of the clarifier thereby providing more net effective surface area than conventional clarifiers.

A further object of the present invention is the provision of such a clarifier which is provided with a cone bottom which concentrates and reduces the volume of sludge thereby reducing the disposal and handling costs, and in which the conventional bottom scraper is unnecessary and has been eliminated thereby reducing fabrication and operation costs.

Other and further objects, features, and advantages are set forth throughout the specification and claims and are inherent in the clarifier.

DESCRIPTION OF PREFERRED EMBODIMENTS

Figure 1:
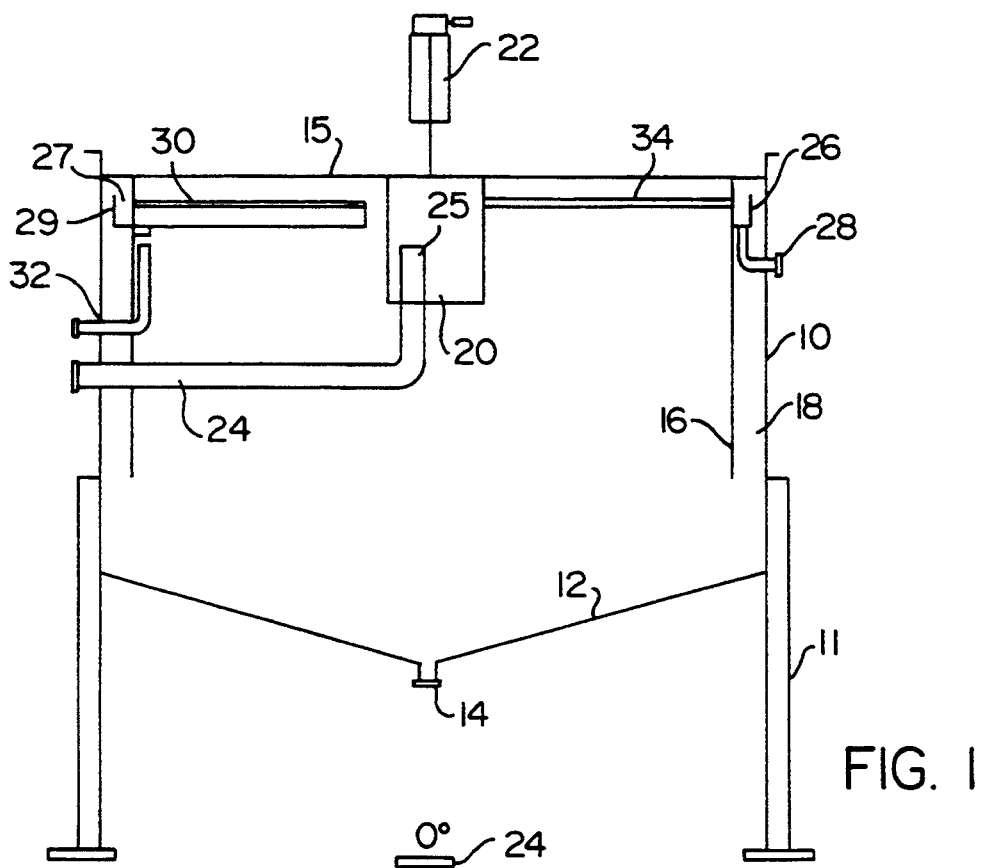
FIG. 1 is a sectional side view of an open top clarifier in accordance with the present invention.
Figure 2:
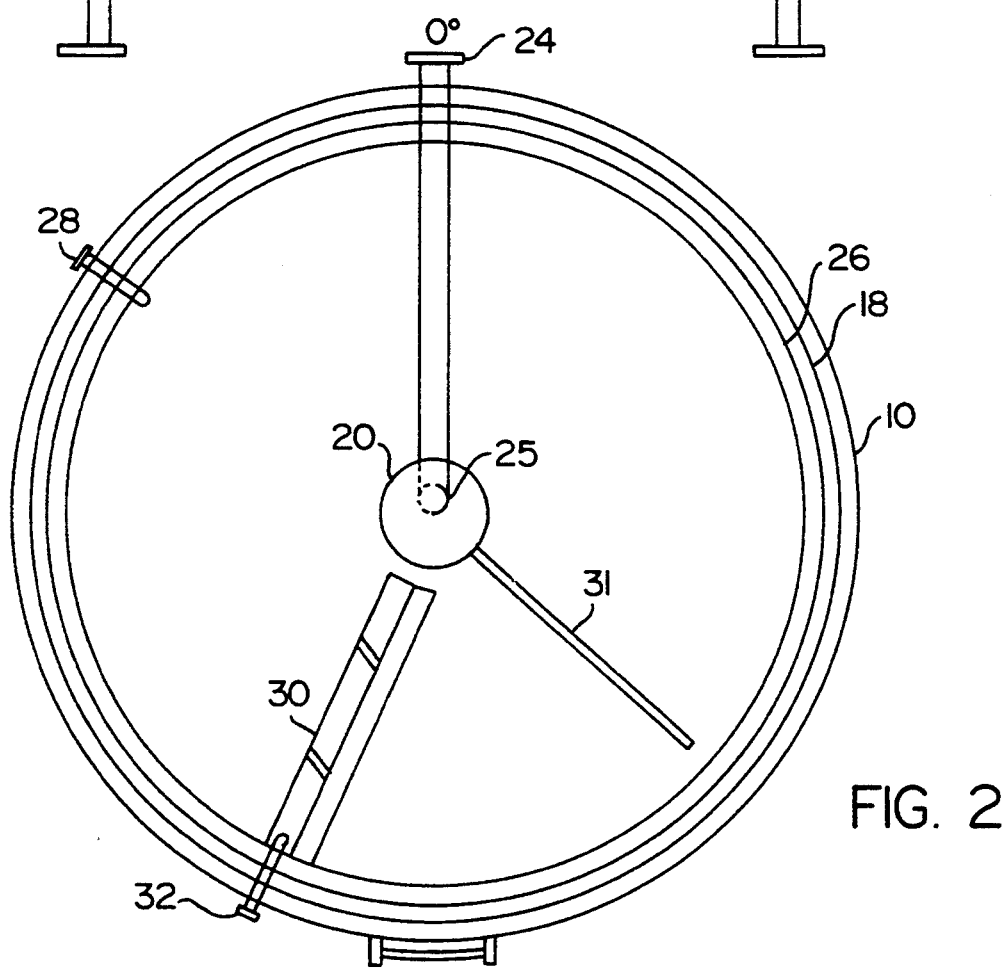
FIG. 2 is a top view of the clarifier of FIG. 1.

Referring to FIGS. 1 and 2, the clarifier has a cylindrical body 10 supported by the legs 11, and, preferably, a cone shaped bottom 12 with a sludge or solids outlet 14 provided at its bottom for removal of separated solids and sludge. The top 15 of the body 10 may be open or closed. In clarification of liquids which cause air pollution, a closed top is used and means (not shown) to prevent air pollution are used.

A cylindrical baffle 16 is disposed within the cylindrical body 10 and extends a substantial distance from the top to adjacent the bottom of the cylindrical body 10 and provides an annular flow space 18 for flow of clarified liquid, such as water, as later described.

Disposed at the upper end in the body and at its central portion is a rotatable stilling well 20 which is rotated by the gear reducer and motor 22. An inlet pipe 24 having its discharge end 25 in the stilling well 20 introduces liquid to be clarified into the interior of the stilling well 22. An annularly extending overflow weir 26 is disposed in the annular flow space 18 adjacent but below the top of the baffle 16 for overflow of clarified liquid and includes the outlet 28 for discharge of clarified liquid from the clarifier. The weir 26 may be secured to either the cylindrical baffle 16 or the cylindrical body 10 and includes generally horizontal and vertical extending parts 27 and 29.

Figure 3:
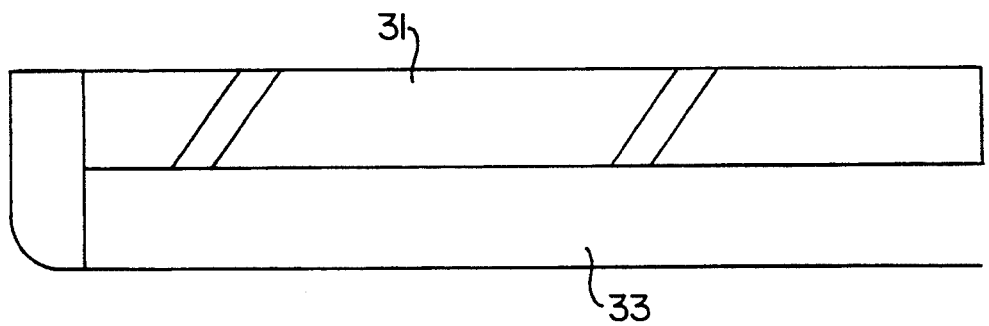
FIG. 3 is a top view of the scum trough of FIGS. 1 and 2.

A scum trough 30 is secured to the baffle 16 adjacent its top and extends a substantial distance inwardly toward the stilling well 20. As best seen in FIG. 3, the scum trough 30 has an open portion 31 and a sloping portion 33 for receiving scum.

Figure 4:
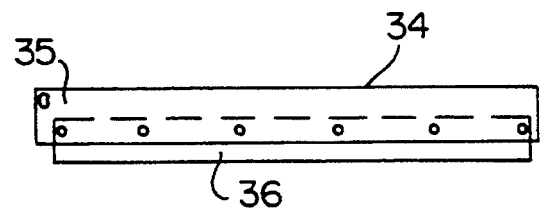
FIG. 4 is a top view of the skimmer of FIGS. 1 and 2.

Secured to and extending outwardly from the rotating stilling well 20 is a skimmer 34 which skims fluid droplets, such as oil, which have risen to the surface and moves them to the oil outlet 32 disposed below the scum trough 30. As best seen in FIG. 4, the skimmer 34 includes an arm 35 and a flexible wiper arm 36 of rubber, neoprene, or other suitable materials. The motor and gear reducer, skimmer and scum or solid trough are conventional and can be of any suitable type. Hence no more description thereof is deemed necessary or given.

In operation, liquid, such as water, to be clarified enters the inlet pipe 24 and flows into the rotating stilling well 22 and flows out and downwardly generally in a conical path. Lighter entrained liquids, such as oil 36, flow upwardly in the cylindrical baffle 16 to the surface level 38. Any solids or sludge gravitates downwardly into the conical bottom 12, and the clarified liquid flows upwardly in the annular space 18 into the overflow weir 26 and out the outlet 28. The separated liquid droplets, such as oil, are constantly being moved toward the outlet by the rotating skimmer arm 31 and flows out the outlet 32. Scum is collected in the scum trough 30.

Various braces, supports, and the like have been omitted from the drawings for clarity in describing the invention. Also, the motor, gear reducer, various connections, and the like are all conventional and are available on the market. Also, suitable handrails, manholes, and the like can be provided as desired.

The method of the invention comprises flowing a liquid having entrained lighter liquid droplets downwardly in a cone shaped flow pattern, permitting the lighter liquid droplets to rise to the surface of the liquid, flowing the liquid clarified of the light oil droplets in a separate annular flow path around the downardly flowing liquid, removing the light liquid droplets from the surface, and discharging the clarified liquid. Any solids present gravitate downwardly or float to the surface and are removed.

The present invention therefore is well adapted and suited to attain the objects and ends and has the advantages mentioned as well as others inherent therein.

While presently preferred embodiments of the invention have been given for the purpose of disclosure, modifications may be made therein which are within the spirit of the invention as defined by the appended claims.

What is claimed is:

1. A gravity clarifier comprising,
   an enclosed upright cylindrical body having a top and a bottom,
   a cylindrical baffle disposed in the body extending a substantial distance from adjacent the top to adjacent the bottom of the cylindrical body providing an annular flow path between the cylindrical body and the cylindrical baffle,
   a rotatable stilling well having an open bottom disposed at the upper end of the body and centrally of the cylindrical baffle,
   inlet means at the top of the body having a discharge end in the stilling well for introducing liquids to be clarified into the stilling well,
   means for rotating the stilling well such that the liquids flow downwardly in a swirling cone-shaped flow path within the cylindrical baffle,
   a continuous annular overflow weir disposed in the annular space adjacent but below the top of the baffle having an open top and closed bottom portions forming an annular overflow flow path,
   the overflow weir spaced from one of the baffle and the body thereby continuing the annular flow path to above the overflow weir but below the top of the baffle, fluid outlet means connected to the bottom of the overflow weir extending exteriorly of the body for discharge of clarified liquid from the annular flow path of the overflow weir, and second outlet means having an inlet disposed interiorly of and at the upper end of the cylindrical baffle and an outlet exteriorly of the body for discharge of gravity separated liquids from the clarified liquids, whereby liquids to be clarified are introduced into the rotating stilling well and flow in a loop flow path, first in the downwardly and outwardly swirling cone-shaped flow path from the discharge end in the distilling well, .light liquids flowing upwardly by gravity within the cylindrical baffle and out the second discharge means, and clarified liquids of the light liquids flowing under the cylindrical baffle in the annular flow path into the annular overflow path of the overflow weir and out the fluid outlet means.

2. The clarifier of claim 1 where, the baffle's lower end extends downwardly toward the bottom of the body to an extent which prevents solids in the liquids from flowinqunder the baffle's lower end and upwardly in the annular flow path, the bottom of the conical body being cone shaped thereby concentrating solids separated from the liquid, and includes an outlet in the bottom of the body for removal of the solids.

3. The clarifier of claim 1 including, a skimmer extending outwardly from the stilling well at its upper end to adjacent the baffle effective to remove lighter entrained liquids and floating materials from the surface to the second outlet means.

4. The clarifier of claim 3 including, a scum trough secured to the cylindrical baffle over the second outlet means to receive sludge on the surface.

5. A method of separating first liquid droplets in a second liquid comprising, flowing the second liquid in a loop flow pattern downwardly in a swirling cone-shaped flow path from a rotating, open bottom stilling well within a cylindrical baffle disposed in a closed cylindrical body, under the cylindrical baffle's lower end and upwardly in an annular flow path formed by the baffle and the body, the first liquid droplets rising by gravity and forming a liquid surface within the baffle, removing the second liquid clarified of the first liquid droplets from the annular flow path, and removing the first liquid droplets from the liquid surface within the baffle.

6. The method of claim 5 where, the first liquid droplets comprise a petroleum based product, and the second liquid comprises water.

7. The method of claim 5 where, the removal of the first liquid droplets includes skimming the first liquid droplets from the liquid surface within the baffle.

8. The method of claim 7 where, the first liquid droplets comprise a petroleum based product, and the second liquid comprises water.

9. The method of claim 5 where, the second liquid also includes solids, the solids flow by gravity to the bottom of the cylindrical body, the baffle's lower end preventing the solids from flowing upwardly in the annular flow path, and removing the solids from the bottom of the cylindrical body.

10. The method of claim 9 where, the first liquid droplets comprise a petroleum based product, and the second liquid comprises water.

* * * * *